United States Patent
Plut

(10) Patent No.: US 7,583,260 B2
(45) Date of Patent: *Sep. 1, 2009

(54) COLOR PRESERVATION FOR SPATIALLY VARYING POWER CONSERVATION

(75) Inventor: William J. Plut, Menlo Park, CA (US)

(73) Assignee: Honeywood Technologies, LLC, Menlo Park, CA (US)

( * ) Notice: Subject to any disclaimer, the term of this patent is extended or adjusted under 35 U.S.C. 154(b) by 663 days.

This patent is subject to a terminal disclaimer.

(21) Appl. No.: 11/157,219

(22) Filed: Jun. 20, 2005

(65) Prior Publication Data

US 2006/0001660 A1 Jan. 5, 2006

Related U.S. Application Data

(63) Continuation-in-part of application No. 10/891,734, filed on Jul. 15, 2004.

(60) Provisional application No. 60/487,761, filed on Jul. 16, 2003.

(51) Int. Cl.
*G09G 5/00* (2006.01)
(52) U.S. Cl. ................ 345/211; 345/52; 345/204; 345/210; 345/212
(58) Field of Classification Search ............... 345/52, 345/76–92, 204–215, 690–699
See application file for complete search history.

(56) References Cited

U.S. PATENT DOCUMENTS

| | | |
|---|---|---|
| 4,952,917 A | 8/1990 | Yabuuchi |
| 5,029,004 A | 7/1991 | Shibayama |
| 5,270,818 A | 12/1993 | Ottenstein |
| 5,359,345 A | 10/1994 | Hunter |
| 5,469,225 A | 11/1995 | Hong |
| 5,488,434 A | 1/1996 | Jung |
| 5,524,249 A | 6/1996 | Suboh |
| 5,572,655 A | 11/1996 | Tuljapurkar |
| 5,592,194 A | 1/1997 | Nishikawa |
| 5,598,565 A * | 1/1997 | Reinhardt .................... 713/323 |
| 5,615,376 A | 3/1997 | Ranganathan |
| 5,619,707 A | 4/1997 | Suboh |
| 5,625,826 A | 4/1997 | Atkinson |
| 5,642,125 A | 6/1997 | Silverstein |

(Continued)

OTHER PUBLICATIONS

Geelhoed et al, "Energy-aware User Interfaces and Energy-adaptive Displays: Improving Battery Lifetimes in Mobile Devices", Proceedings of MobiSys 2003: The First International Conference on Mobile Systems, Applications, and Services, San Francisco May 5-8, 2003.

(Continued)

*Primary Examiner*—Vijay Shankar

(57) ABSTRACT

Described herein are systems and methods that reduce power consumption for an electronics device that includes a display device. The systems and methods identify characteristic color video information for a graphics component that allows a person to visually locate the graphics component in a display area for the display device. Video information in the display area other than the characteristic color video information is then altered to conserve power. Preserving the characteristic color video information for the graphics component maintains a person's ability to locate the graphics component at a later time, even though other portions of the display area have been altered and potentially visually degraded to conserver power.

20 Claims, 8 Drawing Sheets

U.S. PATENT DOCUMENTS

| | | | |
|---|---|---|---|
| 5,675,364 A | 10/1997 | Stedman | |
| 5,719,958 A | 2/1998 | Wober | |
| 5,745,375 A | 4/1998 | Reinhardt | |
| 5,781,768 A | 7/1998 | Jones, Jr. | |
| 5,796,391 A | 8/1998 | Chiu | |
| 5,808,693 A | 9/1998 | Yamashita | |
| 5,822,599 A * | 10/1998 | Kidder et al. | 713/324 |
| 5,914,751 A | 6/1999 | Korth | |
| 5,943,032 A | 8/1999 | Nagaoka | |
| 5,956,014 A | 9/1999 | Kuriyama | |
| 5,961,617 A | 10/1999 | Tsang | |
| 5,991,883 A | 11/1999 | Atkinson | |
| 6,026,179 A | 2/2000 | Brett | |
| 6,029,249 A | 2/2000 | Atkinson | |
| 6,031,914 A | 2/2000 | Tewfik | |
| 6,043,853 A | 3/2000 | Shimazaki | |
| 6,069,440 A | 5/2000 | Shimizu | |
| 6,076,169 A | 6/2000 | Lee | |
| 6,100,859 A | 8/2000 | Kuriyama | |
| 6,104,362 A | 8/2000 | Kuriyama | |
| 6,111,559 A | 8/2000 | Motomura | |
| 6,144,440 A | 11/2000 | Osgood | |
| 6,177,933 B1 | 1/2001 | Young | |
| 6,177,946 B1 | 1/2001 | Sinclair | |
| 6,232,937 B1 | 5/2001 | Jacobsen | |
| 6,278,887 B1 | 8/2001 | Son | |
| 6,297,601 B1 | 10/2001 | Kang | |
| 6,323,880 B1 | 11/2001 | Yamada | |
| 6,345,364 B1 | 2/2002 | Lee | |
| 6,356,284 B1 | 3/2002 | Manduley | |
| 6,362,835 B1 | 3/2002 | Urbanus | |
| 6,366,291 B1 | 4/2002 | Taniguchi | |
| 6,396,508 B1 | 5/2002 | Noecker | |
| 6,396,520 B1 | 5/2002 | Ording | |
| 6,408,293 B1 | 6/2002 | Aggarwal | |
| 6,411,306 B1 | 6/2002 | Miller | |
| 6,411,953 B1 | 6/2002 | Ganapathy | |
| 6,414,675 B1 | 7/2002 | Shen | |
| 6,452,610 B1 | 9/2002 | Reinhardt | |
| 6,453,076 B1 | 9/2002 | Nakajima | |
| 6,473,078 B1 | 10/2002 | Ikonen | |
| 6,473,532 B1 | 10/2002 | Sheraizin | |
| 6,496,165 B1 | 12/2002 | Ide | |
| 6,529,212 B2 | 3/2003 | Miller | |
| 6,552,736 B2 | 4/2003 | Honda | |
| 6,587,087 B1 | 7/2003 | Ishizuka | |
| 6,606,103 B1 | 8/2003 | Hamlet | |
| 6,611,608 B1 | 8/2003 | Wu | |
| 6,621,489 B2 | 9/2003 | Yanagisawa | |
| 6,628,067 B2 | 9/2003 | Kobayashi | |
| 6,657,634 B1 | 12/2003 | Sinclair | |
| 6,661,029 B1 | 12/2003 | Duggal | |
| 6,661,428 B1 | 12/2003 | Kim | |
| 6,667,727 B1 | 12/2003 | Iwaoka | |
| 6,677,924 B2 | 1/2004 | Nakayama | |
| 6,677,936 B2 | 1/2004 | Jacobsen | |
| 6,683,605 B1 | 1/2004 | Bi | |
| 6,691,236 B1 | 2/2004 | Atkinson | |
| 6,693,385 B2 | 2/2004 | Koyama | |
| 6,701,263 B2 | 3/2004 | Jeong | |
| 6,711,212 B1 | 3/2004 | Lin | |
| 6,724,149 B2 | 4/2004 | Komiya | |
| 6,724,151 B2 | 4/2004 | Yoo | |
| 6,731,815 B1 | 5/2004 | Hu | |
| 6,744,818 B2 | 6/2004 | Sheraizin | |
| 6,762,741 B2 | 7/2004 | Weindorf | |
| 6,768,520 B1 | 7/2004 | Rilly | |
| 6,774,878 B2 | 8/2004 | Yoshida | |
| 6,788,003 B2 | 9/2004 | Inukai | |
| 6,788,822 B1 | 9/2004 | Zhang | |
| 6,791,566 B1 | 9/2004 | Kuratomi | |
| 6,801,811 B2 | 10/2004 | Ranganathan | |
| 6,809,706 B2 | 10/2004 | Shimoda | |
| 6,812,650 B2 | 11/2004 | Yasuda | |
| 6,816,135 B2 | 11/2004 | Ide | |
| 6,819,036 B2 | 11/2004 | Cok | |
| 6,822,631 B1 | 11/2004 | Yatabe | |
| 6,829,005 B2 | 12/2004 | Ferguson | |
| 6,839,048 B2 | 1/2005 | Park | |
| 7,432,897 B2 | 1/2005 | Nishitani | |
| 6,850,214 B2 | 2/2005 | Nishitani | |
| 7,460,103 B2 | 2/2005 | Konno | |
| 6,938,176 B1 | 8/2005 | Alben | |
| 7,012,588 B2 | 3/2006 | Siwinski | |
| 7,114,086 B2 | 9/2006 | Mizyuabu et al. | |
| 7,463,235 B2 | 12/2008 | Hiyama | |
| 2001/0032321 A1 | 10/2001 | Nanno et al. | |
| 2001/0033260 A1 | 10/2001 | Nishitani | |
| 2002/0063671 A1 | 5/2002 | Knapp | |
| 2003/0001815 A1 | 1/2003 | Cui | |
| 2003/0071805 A1 | 4/2003 | Stanley | |
| 2003/0126232 A1 | 7/2003 | Mogul | |
| 2003/0135288 A1 | 7/2003 | Ranganathan | |
| 2003/0156074 A1 | 8/2003 | Ranganathan | |
| 2003/0201969 A1 | 10/2003 | Hiyama | |
| 2004/0041780 A1 | 3/2004 | Ko | |
| 2004/0160435 A1 | 8/2004 | Cui et al. | |
| 2005/0052446 A1 | 3/2005 | Plut | |
| 2005/0057484 A1 | 3/2005 | Diefenbaugh et al. | |
| 2005/0057485 A1 | 3/2005 | Diefenbaugh | |
| 2005/0068289 A1 | 3/2005 | Diefenbaugh et al. | |
| 2005/0068332 A1 | 3/2005 | Diefenbaugh et al. | |
| 2005/0110717 A1 | 5/2005 | Iwamura | |
| 2005/0134547 A1 | 6/2005 | Wyatt | |
| 2005/0270265 A1 | 12/2005 | Plut | |
| 2005/0270283 A1 | 12/2005 | Plut | |
| 2005/0275651 A1 | 12/2005 | Plut | |
| 2005/0289363 A1 | 12/2005 | Tsirkel et al. | |
| 2006/0001641 A1 | 1/2006 | Degwekar et al. | |
| 2006/0001658 A1 | 1/2006 | Plut | |
| 2006/0001659 A1 | 1/2006 | Plut | |
| 2006/0020906 A1 | 1/2006 | Plut | |
| 2006/0071899 A1 | 4/2006 | Chang | |
| 2006/0092182 A1 | 5/2006 | Diefenbaugh et al. | |
| 2006/0125745 A1 | 6/2006 | Evanicky | |
| 2006/0132474 A1 | 6/2006 | Lam | |
| 2006/0146003 A1 | 7/2006 | Diefenbaugh et al. | |
| 2006/0146056 A1 | 7/2006 | Wyatt | |
| 2006/0250385 A1 | 11/2006 | Plut | |
| 2006/0250525 A1 | 11/2006 | Plut | |
| 2007/0002035 A1 | 1/2007 | Plut | |

OTHER PUBLICATIONS

Iyer et al., "Energy-adaptive Display Designs for Future Mobile Environments" Proceeding of ModiSys 2003: The First International Conference on Mobile Systems, Applications, and Services, San Francisco, CA, May 2003.
Office Action in U.S. Appl. No. 10/891,734 dated Jul. 17, 2007.
Office Action in U.S. Appl. No. 10/891,734 dated Feb. 6, 2008.
Office Action #1 in U.S. Appl. No. 11/157,112 dated May 14, 2008.
Office Action #1 in U.S. Appl. No. 11/157,217 dated May 15, 2008.
Office Action #1 in U.S. Appl. No. 11/122,314 dated Apr. 17, 2008.
Office Action #1 in U.S. Appl. No. 11/122,319 dated Apr. 8, 2008.
Office Action #1 in U.S. Appl. No. 11/122,313 dated Jun. 26, 2008.
Office Action #2 in U.S. Appl. No. 11/122,319 dated Oct. 9, 2008.
Office Action #3 in U.S. Appl. No. 10/891,734 dated Oct. 7, 2008.
Office Action #1 in U.S. Appl. No. 11/157,210 dated Jul. 10, 2008.
Office Action #2 in U.S. Appl. No. 11/157,210 dated Jul. 10, 2008.
Office Action #2 in U.S. Appl. No. 11/157,112 dated Dec. 29, 2008.
Office Action #2 in U.S. Appl. No. 11/122,314 dated Oct. 29, 2008.
Office Action #2 in U.S. Appl. No. 11/122,313 dated Mar. 4, 2009.
Hardening Windows Systems 2000, System Experts 2001, Philip Cox et al.

* cited by examiner

COLOR PRESERVATION FOR SPATIALLY VARYING POWER CONSERVATION

CROSS-REFERENCE TO RELATED APPLICATIONS

This application is a continuation-in-part and claims priority under 35 U.S.C. §120 from commonly-owned and co-pending U.S. patent application Ser. No. 10/891,734, filed Jul. 15, 2004 and titled "SPATIAL-BASED POWER SAVINGS", which claimed priority under 35 U.S.C. §119(e) from U.S. Provisional Patent Application No. 60/487,761 filed on Jul. 16, 2003; each of these applications is incorporated herein by reference for all purposes.

FIELD OF THE INVENTION

This invention relates to systems and methods that reduce power consumed by an electronics device including a display. More particularly, the present invention relates to techniques for conserving power by altering video information for portions of a display area while preserving characteristic color video information for graphics components in the display area.

BACKGROUND OF THE INVENTION

Video output consumes a significant amount of power for a laptop or desktop computer. Other computing systems and electronics devices—such as handheld computing devices, cellular telephones and music players—also devote a large fraction of their power budget to video. Power consumption sensitivity increases for portable devices that rely on a battery having limited energy supply.

Currently, commercially available power conservation techniques alter an entire image at once. Most techniques uniformly shut down a display or unvaryingly modify all video output in an image after some predetermined time. These techniques usually impede a person's ability to see graphics items and further use the computing device. Frequently, a person responds by reactivating the entire display—at full power. As a result, little power is saved.

SUMMARY OF THE INVENTION

The present invention provides systems and methods that reduce power consumption for an electronics device that includes a display device. The systems and methods identify characteristic color video information for a graphics component that allows a person to visually locate the graphics component in a display area for the display device. Video information in the display area other than the characteristic color video information is then altered to conserve power. Preserving the characteristic color video information for the graphics component maintains a person's ability to locate the graphics component at a later time, even though other portions of the display area have been altered to conserver power.

Some embodiments may alter the characteristic color video information in addition to altering video information other than the characteristic color video information. In this case, video information for the former is altered less aggressively than the latter. This preferential treatment still allows a user to subsequently locate the graphics component.

Since the characteristic color video information often occupies a minor percentage of the display area, avoiding or minimizing power conservation video alterations for these relatively small portions does not contribute largely to power consumption—but maintains a person's ability to subsequently locate and return to using a graphics component and display area.

In one aspect, the present invention relates to a method for reducing power consumed by an electronics device that includes a display device. The method comprises identifying characteristic color video information for a graphics component that allows a person to visually locate the graphics component in a display area for the display device. The method also comprises altering video information in the display area, other than the characteristic color video information, to produce altered video information, such that the display device will consume less power when displaying the altered video information than an amount of power that would be required to display the video information without the alteration. The method further comprises displaying the altered video information with the characteristic color video information.

In another aspect, the present invention relates to a method for reducing power consumed by an electronics device. The method comprises identifying characteristic color video information for a graphics component. The method also includes monitoring user activity, and after a threshold inactivity time, altering video information in the display area other than the characteristic color video information.

In yet another aspect, the present invention relates to a computer readable medium including instructions for reducing power consumed by an electronics device that includes a display device.

These and other features of the present invention will be presented in more detail in the following detailed description of the invention and the associated figures.

DESCRIPTION OF THE PREFERRED EMBODIMENTS

Figure 1A:
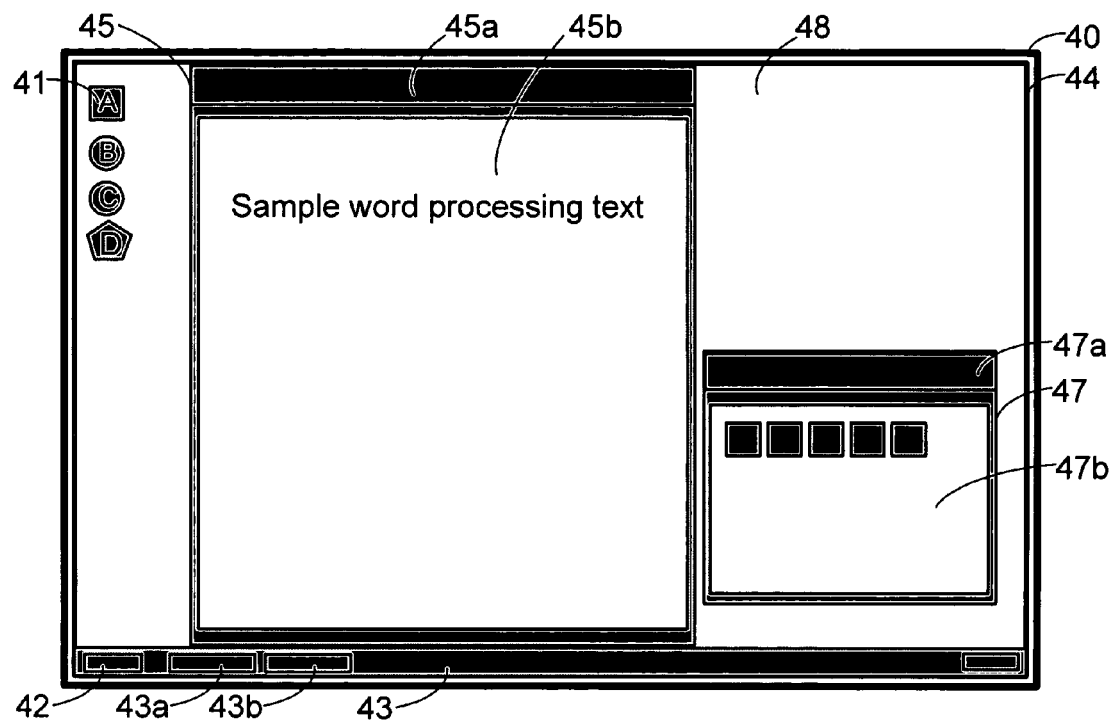
FIG. 1A illustrates video information output on a display device suitable for use with a laptop computer or desktop computer in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Power conservation methods and systems described herein identify and preserve characteristic color video information for a graphics component that allows a person to visually locate the graphics component in a display area for the display device. Video information other than the characteristic color video information is altered such that the alteration decreases power consumption for a display device or an electronics device. Often, these power conservation alterations degrade visual quality and/or perceptibility of the altered video information. Meanwhile, the characteristic color video information may be left untouched and unaltered. In another embodiment, video information for the characteristic color video information is also altered to decrease power consumption, albeit to a lesser extent or rate. In either case, the present invention preserves a person's ability to see and detect the characteristic color video information at a later time when information around the characteristic color video information has been altered.

For example, a person may stop using a handheld or laptop computer for some time. The present invention identifies characteristic color video information for a graphics component whose usage may be relevant to a person when the person returns to using the device. For example, the graphics component may include a window that corresponds to a program the person was last using before inactivity in the display area began. The characteristic color video information for the window is then at least partially preserved so as to not degrade a person's ability to detect the window—while other video information in the display area is altered to conserve power. This may be done for multiple windows and other graphics components such as icons, toolbars, etc.

The video information other than the characteristic color video information is altered at some time (e.g., due to inactivity in the display area) according to power conservation system design. This may include decreasing the brightness and luminance, decreasing saturation for the video information, etc. Several suitable alterations to conserve power are described below. Power conservation system designers and/or users may also vary the rate of video information alterations and/or set a lower limit for alterations and video information presentation. The alteration may occur once, multiple times, or continuously according to power conservation control. Often, alteration produces or progresses to a state where the video information other than the characteristic color video information is significantly visibly degraded—or even unrecognizable. For example, saturation and/or luminance for the video information other than the characteristic color video information may be reduced to black, or some minor fraction of its original saturation and/or luminance level, that compromises visual processing and recognition.

The amount of power conserved will depend on the display device. OLED devices are current driven devices where electrical current flow to individual pixel elements varies with light output and video information for each pixel. Reducing RGB values for each pixel (or luminance, which then reduces RGB values) draws less current on a pixel-by-pixel basis. For many LCD devices, perceived luminance at each pixel of the LCD is a combination of backlight level and transmissivity of the video information using pixilated filters. To reduce power, one may alter video information so as to reduce transmissivity to the point where a lower backlight level may be used when displaying lower luminance video information. Hardware power consumption and conservation is described in further detail below.

When the person returns to the display, even though video information other than the characteristic color video information has been altered and degraded (and corresponding power savings achieved), the user may still readily detect and locate the preserved characteristic color video information and use it to readily return to usage of a graphics component and electronics device without any intermediate steps or without activating the entire display, e.g., just to find the graphics component. The present invention thus preserves the person's ability to detect and locate a graphics component and maintains their ability to quickly return to usage of the device—after video information has been altered and degraded to conserve power. This also avoids annoyance by users that prefer to be able to see some active video at any time, informs a user that a computer has not entered a hibernate mode when it has not (entire screen shut-downs are often confused as a hibernate mode, very noticeable in their sudden luminance change, and commonly cause a user to re-activate the entire display to avoid entering the hibernate mode), and preserves visual perception for portions of a display area that are typically returned to after inactivity, such as windows, icons and other graphics components used before the inactivity began.

Some embodiments alter the characteristic color video information in addition to altering video information other than the characteristic color video information. In this case, the characteristic color video information is altered less aggressively. This preferential treatment allows a user to subsequently identify the graphics component with visual salience and recognition relatively greater than the remainder of video information in the display area.

The present invention finds use with a wide array of display devices and electronics devices. For example, desktop and laptop computers with 12-20" display areas, measured diagonally, are now common and may benefit from techniques described herein. The present invention is particularly useful for portable electronics devices powered from a battery or other limited source of energy. Video conservation techniques described herein may significantly extend battery longevity and useable time for the portable electronics device.

FIG. 1A illustrates video information output on a display device 40 suitable for use with a laptop computer or desktop computer. While the present invention will now be described as video information, graphics components and hardware components, those skilled in the art will recognize that the subsequent description may also illustrate methods and discrete actions for reducing power consumption for a display device and associated electronics device.

Display device 40 displays video information, and may include a liquid crystal display (LCD) device, projector, or an organic light emitting diode (OLED) device. Other display devices and technologies are suitable for use with the present invention.

Display device 40 outputs video information for a laptop or desktop computer within a display area 44. Display area 44 refers to a current image size of a display device. Pixel dimensions may characterize the size of display area 44. Physical dimensions (e.g., inches) that span an image produced by the display device may also characterize the size of display area 44. The display area 44 may be less than a maximum display area for the device, e.g., when a user manually alters horizontal and vertical expansion of a CRT image. Linear dimensions for display area 44 output by a projector will vary with the distance between the receiving surface and projector output lens and a splay angle for the projector. The physical dimensions may be measured on the projected image, usually after any keystone distortion has been suitably corrected for, which may also decrease the display area relative to the maximum display area. To facilitate discussion of LCD based power savings, device 40 will also be referred to as an LCD 40.

An electronics device, such as a desktop, laptop or handheld computer, often runs a graphics-based user interface 42. The graphics-based user interface 42 facilitates interaction between a user and the laptop computer and/or between the user and one or more programs run on the computer. Several suitable graphics-based user interfaces 42 are well known and commercially available, such as those provided by Microsoft of Redmond, Wash., and Apple Computer of Cupertino, Calif., for example. Interface 42 also controls video information output on LCD 40.

The video information refers to data for display using the display device 40 to produce a visual representation of some form. The video information data is typically stored in a logical manner using values assigned to pixel locations. The pixel locations may correspond to a pixel arrangement used for display device 40 or an arrangement used for storing the data. Exemplary color schemes suitable for assigning values to video information are described below. Stored video information may include a resolution that may or may not match a resolution for display device 40. For example, picture video information used for background 48 may be stored as a bitmap having a resolution that does not match the resolution of LCD 40. Background 48 represents a backdrop graphics item for graphics-based user interface 42, and may include a picture, single color or other backdrop graphics.

The video information in display area 44 includes one or more graphics components. A graphics component refers to a discrete visual object output by display device 40. A wide variety of graphics components are suitable for video information preservation as described herein, and the present invention is not limited to any particular graphics component. Icons 41 are a popular graphics component that each corresponds to a particular program; selecting an icon 41 allows a user to initiate a program offered on the electronics device. Toolbar 43 is another graphics component that offers a visual tool for graphics-based user interface 42. Toolbar 43 includes a number of its own graphics components, such as toggles 43*a*-43*b* and a clock, to help a user interact with the electronics device and programs provided thereon.

Windows 45 and 47 are graphics components and output video information related to a program running on the computer. Common programs include word processing programs, file navigation displays, Internet Browsers, drawing programs, music player programs, and video games, for example. For FIG. 1A, window 45 provides video information for a word processing program, while window 47 provides video information for a file navigation program. Other programs are known in the art and the present invention is not limited by any particular graphics-based user interface 42 or program run therewith. Windows 45 and 47 may each include their own bitmap comprising an array of pixel values. Rectangular windows are common and vary in size from a maximum size that roughly spans a display area 44 to smaller sizes within display area 44. Windows 45 and 47 may also be operated in minimized states where the program is active but the window is not visible. A toggle 43*a* or 43*b* on toolbar 43 allows switching between these states.

Windows 45 and 47, icons 41, toolbar 43, and toggles 43*a* and 43*b*, each include a border portion and an internal portion. For example, window 45 includes an edge portion 45*a* and an internal portion 45*b* that includes sample word processing text, while window 47 includes a border portion 47*a* and an internal portion 47*b* that includes several depictions of files and folders. For a window, the internal portion often includes a main work area for user input. For example, a window that outputs video information for a drawing program may include a border portion and an internal main work area, which usually displays a white backing that will consume maximal power when displayed.

The present invention discriminates what video information is altered in display area 44 (and for each graphics component) to preserve perception of each graphics component. In one embodiment, power conservation preserves characteristic color video information for one or more graphics components. In another embodiment, power conservation minimizes visual impact of alterations to characteristic color video information.

As the term is used herein, characteristic color video information refers to any subset of video information for a graphics component that allows a user to identify the graphics component based on color recognition or is useful for identification of a graphics component in a display area based on color recognition. The characteristic color video information may be more noticeable when video information other than the characteristic color video information has been altered or degraded according to power conservation. For example, the video information other than the characteristic color video information may be reduced in saturation (made more grey) and/or luminance (darker), which will make any characteristic colors more noticeable (e.g., there is less visual noise for that color in the display area 44). In a specific embodiment, the characteristic color video information includes color video information in a border portion of a window. The color video information makes the border more noticeable, while the border portion facilitates identification of a graphics component based on shape detection.

Generally, human perception of visual information is a combination of the physical composition of a light beam (spectral composition, intensity, etc.), physiological processes in the human eye, physiological processes in the optic nerves as a consequence of light stimulus in the eye, and processing of these optic stimuli in the brain.

Human vision employs a number of processing and information reduction mechanisms that convert light and potentially tremendous amounts of ambient visual information into a manageable biochemical signal. The main information reduction mechanisms include: edge detection, shape detection, motion detection, and foreground/background separation. Foreground/background separation divides an environment to into a foreground where relatively more information is processed (e.g. allows more detail, such as looking closely at an insect in hand) and a background where less information is processed (e.g. provides less detail, such as the ambient room). Motion detection reduces detail for moving objects to allow motion processing (e.g., watching the insect fly through a room, albeit at lower detail than when in hand). Edge detection converts continuous color and luminance information or objects into lines (e.g., converting a uniform color square into four lines). Shape detection allows a person to recognize objects using lines, such as outer contours that resemble a shape for the object (e.g., a checkerboard based on its known arrangement of adjacent squares). While these mechanisms are useful to reduce the large volume of information sent to the brain at any one instance, they also create imperfections in visual perception.

Figure 6:
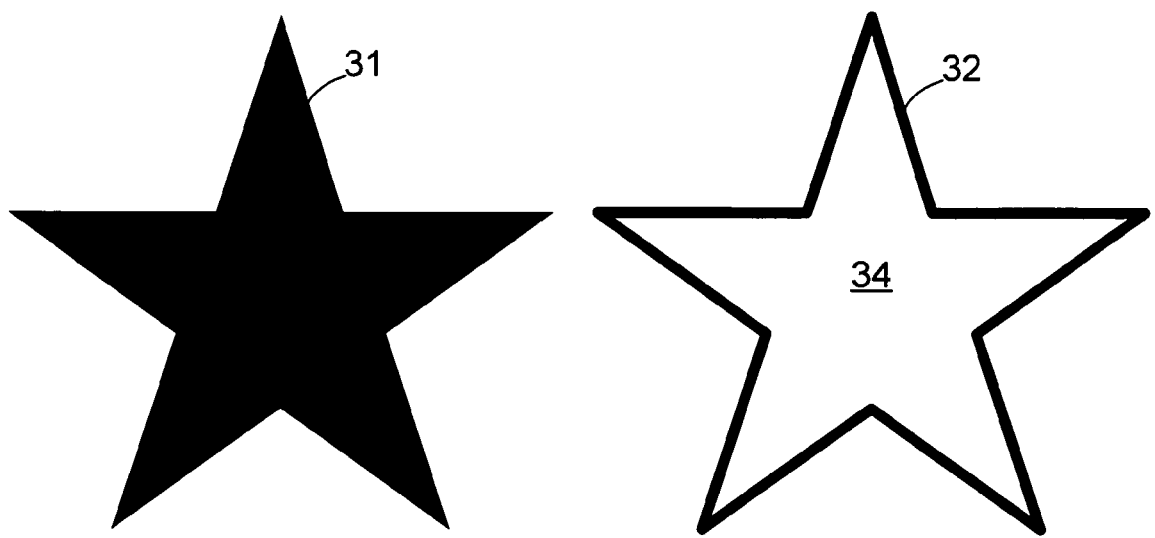
FIG. 6 demonstrates a visual information reduction mechanism employed by the human vision system that allows a person to recognize objects based edge information and shape.

In one embodiment, the present invention leverages imperfection in human visual processing to alter video information and reduce power consumption by a display device. As described above, edge and shape detection are visual information reduction mechanisms employed by the human vision system that allow a person to recognize objects based on reduced information—namely, its edge patterns and shape. FIG. 6 illustrates this mechanism for a simple star 31. As shown, a person's visual system processes star 31 to produce an edge pattern 32, while disregarding information in internal portion 34 (commonly, adjacent visual input of relatively the same color and luminance is disregarded by the visual processing system until a change occurs: edge detection). This first edge detection visual processing technique reduces the amount of information sent to the brain: the internal portion 34 is not typically sent, just the edge pattern 32. Second, the brain receives a signal for the edge information 32 from visual processing and recognizes it as a 'star'.

The present invention leverages these human processing schemes to reduce the amount of power output by display device without sacrificing the ability for a user to identify and locate a window. In one embodiment, video alteration preserves characteristic color video information that allows a person to identify and locate a window based on its edge information and/or shape for the color. For example, this may include identifying characteristic color video information for a window that allows a person to a) visually distinguish the characteristic color video information based on its color, and b) identify and locate the window based on shape and/or edge detection of the color video information.

Figure 1B:
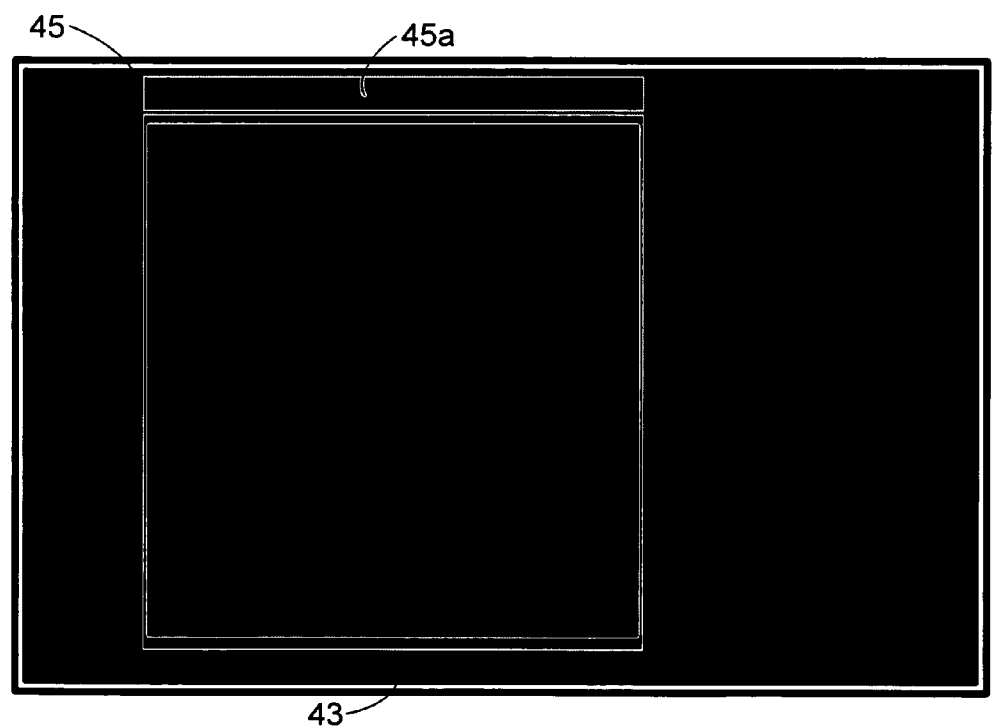
FIG. 1B illustrates the display device of FIG. 1A after video information alteration and characteristic color video information preservation for a single window in accordance with a specific embodiment of the present invention.

FIG. 1B shows the preservation of characteristic color video information in border portion 45a for window 45, while luminance for video information other than the characteristic color video information in display area 44 has been reduced, in accordance with a specific embodiment of the present invention.

Many graphics-based user interfaces 42 include characteristic colors for windows and graphics components, such as a color set using an appearance theme, e.g., the setting designates that all windows include a blue, 'rose' or 'teal' color in the border portion 45a. The characteristic color allows a user to identify a window based on a known, expected and consistent color of the window. If the characteristic color is rose for example, then video information in display area 44 is reduced in luminance (and color if present) to reduce power, while the rose color in border portion 45a is preserved to permit color-based recognition of window 45.

In another embodiment, both color and shape are used to facilitate recognition of a graphics component. This involves a two-step recognition process. First, the present invention identifies characteristic color video information (perimeter and/or other) for a window, preserves the color video information amidst alterations to other video information in the display area 44, and allows a person to visually locate border portion 45a based on its color. Second, border portion 45a characteristically resembles the shape of a rectangular word processing window, which permits easy identification and location of window 45 based on shape detection of the preserved color information. This permits identification of window 45 based on: a) color-based recognition of border portion 45a and b) shape recognition of window 45 using border portion 45a.

To conserve power, the present invention alters video information other than the characteristic color video information such that a display device outputting the altered video information consumes less power than an amount of power required to display the video information without alteration. As shown, luminance for all pixels other than border portion 45a has been reduced. Additional power conservation alterations will be described in further detail below.

As shown in FIG. 1B, characteristic color video information in border portion 45a does not decrease in luminance over time. Since video information in border portion 45a represents a relatively small portion of display area 44, and a likely place for subsequent user interaction and visual recognition, power conservation may be slightly sacrificed for the expected demand of window 45 usage. In a specific embodiment, characteristic color video information is preserved for a window if it was the last the graphics components used in display area 44 before inactivity began (window 45 in this case as opposed to window 47).

Power conservation also decreased luminance for video information in internal portion 45b. Internal portion 45b, which mainly comprises text for a word processing window, includes video information not generally required for shape detection of the window. As shown, internal portion 45b is reduced in luminance to conserve power, while video information for border portion 45a has been preserved to facilitate color and/or shape recognition. Power conservation internal to a window may reduce power consumption of this area (depending on the display device) and does not compromise the ability to identify window 45 and its associated program based on color and/or shape. The internal white portion of a window often constitutes most of the surface area for the window. For an OLED display with pixel granularity power consumption for example, this internal alteration reduces most of the power required to display the window.

The present invention allows a user to detect and readily return to window 45 usage within display area 44—by preserving a border portion 45a that constitutes a relatively small proportion of display area 44—while reducing video output and power consumption from the rest of the display area 44. In contrast, conventional display devices and power conservation require the entire display area to be active and consume power. For larger display areas, displaying only border portion 45a and not the remainder of display area 44 may lead to a 70+ percent reduction in power consumption, which is particularly valuable when the display device is powered by a battery in a portable computer.

The border portion 45a may also include text that designates the program name or file currently open. For many graphics-based user interface 42 designs, a window 45 includes text within a border portion that identifies the window. For a word processing window, the text may include a specific file name and program name. For a music player program, the text may include the player program name. For a file navigation display, the text may include a current file or directory. In one embodiment, the present invention maintains video information detail in border portion 45a such that text remains visible. This allows a user to scan an altered display area 44, find border portion 45a, read any text therein, and identify window 45 amongst a number of similar word processing windows without a need for reactivating the entire display area 44.

In one embodiment, the present invention alters the characteristic color video information in addition to other video information in the display area 44. For example, video information for the former may be altered at a slower rate and less aggressively than alterations to the background and other portions of the display area.

Figure 1C:
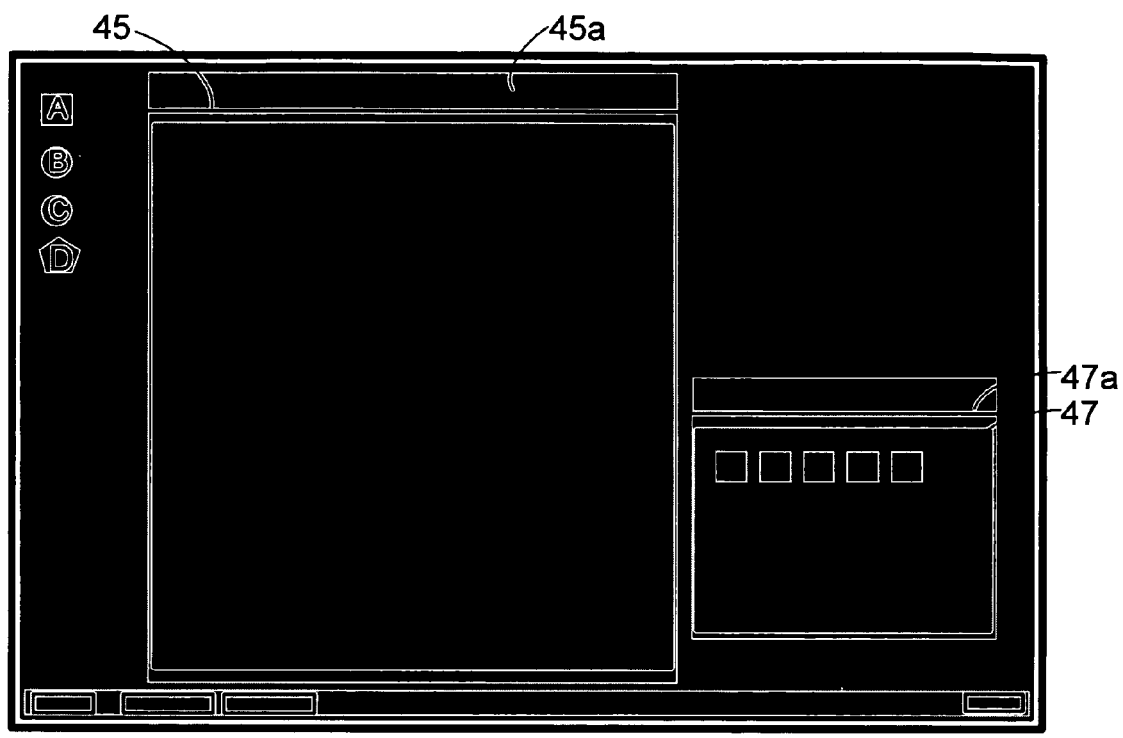
FIG. 1C illustrates the display device of FIG. 1A after alteration and preservation of the characteristic color video information preservation in accordance with another specific embodiment of the present invention.

So far, characteristic color video information has primarily been shown, discussed and preserved for a single graphics component. Characteristic color video information for multiple graphics components may be preserved. FIG. 1C shows the display device of FIG. 1A after video information alteration and characteristic color video information preservation in border portions for two windows 45 and 47, color preservation for icons 41, and color preservation for toolbar 43 in accordance with another specific embodiment of the present invention.

Many icons 41 include one or more characteristic colors that facilitate rapid recognition based on color, particularly when the remaining areas of display area 44 have been reduced in luminance and/or saturation. In one embodiment, the present invention preserves all perimeter and internal colors of an icon. This maintains the ability to identify the icon based on its color appearance. Similarly, toolbar 43, which is often returned to after inactivity, is also preserved based on the likelihood of usage so a user can readily locate and use it.

So far, characteristic color video information has mainly been described with respect to perimeter information. The characteristic color video information may also include color video information internal to the perimeter regions. This internal characteristic color video information increases the amount of color detection video information for a graphics component and distinguishes similarly shaped graphics components. For example, graphics components with similar shapes and color borders may include more internal edge information to facilitate differentiation. As shown in FIG. 1C, window 47 includes various internal file representations whose characteristic color video information is preserved to differentiate recognition of window 47 as a file navigation window after power conservation begins. Other internal information may be preserved to differentiate a graphics component, and will depend on the graphics component, as one of skill in the art will appreciate. Toolbar portions and upper border portions for each window 45 and 47 may also be preserved to facilitate their recognition. Other internal color detection information may also be preserved. FIG. 2B shows preservation of perimeter and internal characteristic color video information for several icons 26 to facilitate recognition of each icon. In general, the present invention may preserve any internal or perimeter video information for a graphics component suitable for color and/or shape detection and recognition.

Notably, the present invention conserves power without substantially compromising usability of the electronics device. More specifically, the video information is altered such that the person may still see windows 45 and 47 icons 41, and toolbar 43 in display area 44. Thus, a user may still perceive visual information relevant for interaction after returning to the display after a period of non-usage.

While FIGS. 1A-1C illustrate one specific display device suitable for laptop and desktop computers, power conservation techniques described herein are also well suited for use with other electronics devices. Other exemplary devices include handheld computers, cellular telephones, portable music players, digital cameras, and other portable computing and electronics devices that include a video display.

Figure 2A:
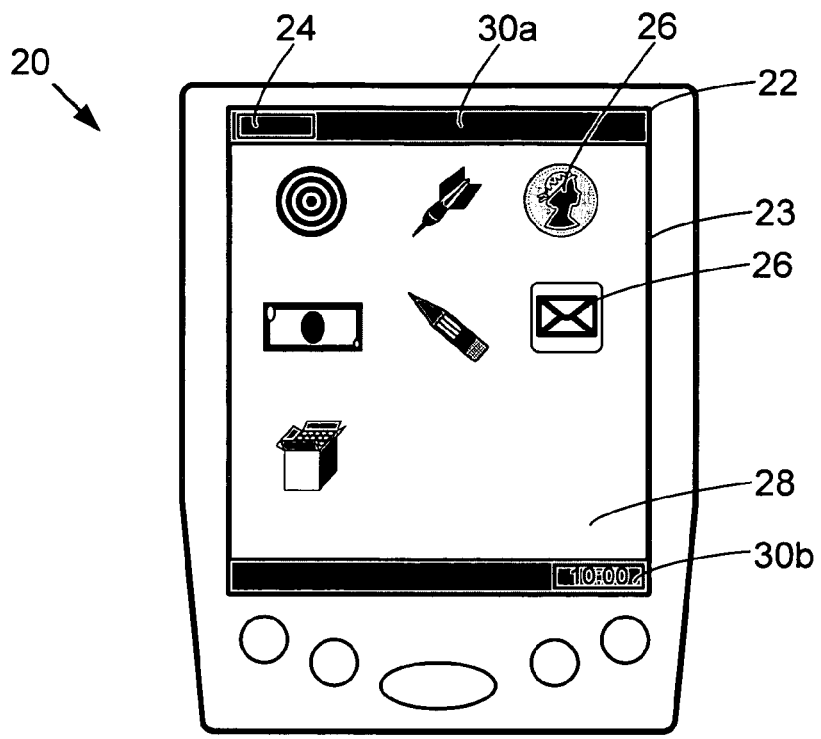
FIG. 2A illustrates a handheld computer device in accordance with one embodiment of the present invention.
Figure 2B:
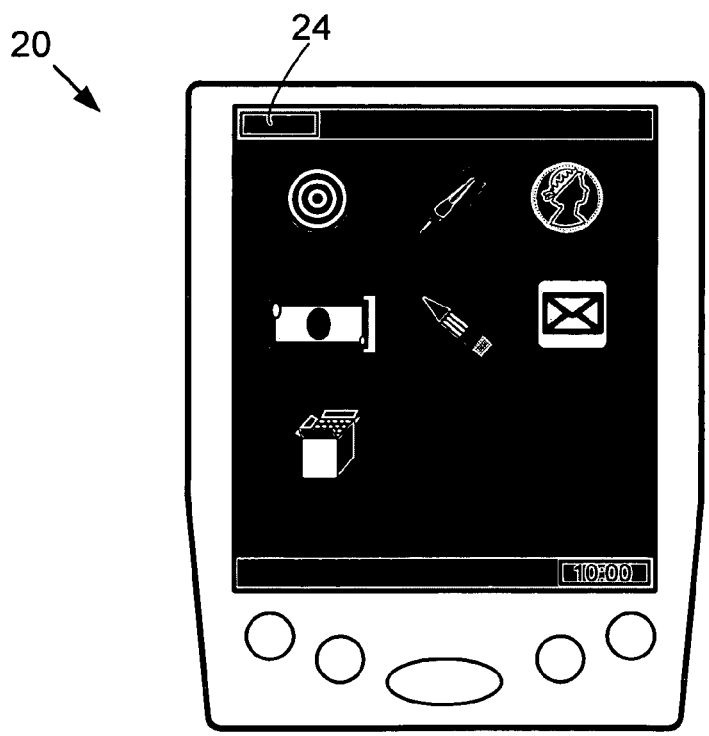
FIG. 2B illustrates the handheld device of FIG. 2A after video information alteration and characteristic color video information preservation in accordance with a specific embodiment of the present invention.

FIG. 2A illustrates a handheld computer device 20 in accordance with one embodiment of the present invention. FIG. 2B illustrates handheld device 20 after video information alteration in accordance with a specific embodiment of the present invention.

Handheld computer device 20 includes a display device 22 that displays video information. Individual pixel locations within a display area 23 for device 22 permit allocation and addressing of video information displayed within a display area 23. Pixel dimensions and resolution may characterize display area 23. For example, display device 22 may comprise an OLED display device that offers pixel dimensions of 480×640. The OLED device permits video information changes for individual pixels to affect power consumption and conservation at pixel granularity.

Handheld device 20 runs a graphics-based user interface 24 within display area 23. Interface 24 facilitates interaction between a user and device 20 and/or between the user and one or more programs run on computer device 20. To do so, interface 24 outputs video information on display device 20. As shown in FIG. 2A, interface 24 currently displays a background 28 and a set of icons 26 that each correspond to a program available on device 20. The icons 26 are displayed on background 28, which includes its own set of background video information and provides a backdrop environment for graphics-based user interface 24. Two toolbars 30 are output in display area: a top toolbar 30a that includes a pull-down toggle for interface 24 and a bottom toolbar 30b that includes a clock.

FIG. 2A illustrates display area 23 before alteration of video information in display area 23, while FIG. 2B shows display area 23 after alteration of video information. As shown in FIG. 2B, video information in background 28 has been turned to black. Lesser alterations to the video information in background 28 may be used.

Notably, the present invention conserves power without substantially compromising usability of electronics device 20. More specifically, the video information is altered such that the person may still see color in icons 26 and toolbars 30 within display area 23. For example, the user may still readily detect red in the target icon 26, green in the money icon 26, and yellow in the pencil icon 26. In this manner, a user may still perceive visual information relevant for interaction after returning to the display after a period of non-usage.

Having discussed video information preservation and exemplary graphics, power conservation will now be expanded upon.

The present invention may implement a wide array of video alterations to conserve power. In general, the alteration reduces the amount of power that would be required to display the altered video information relative to the video information without the alteration. Alterations may vary according to the video information, time, usage of the electronics device, the display device and its power consumption characteristics, etc.

In one embodiment, video alteration occurs based on user activity—or lack thereof. Activity may comprise a) user input within a perimeter or outer boundary for a window for a program—as determined by the program associated with the window, b) program output to the user—as determined by the program, and/or c) user input in the background 48 or interaction with the graphics-based user interface 42.

Interaction that qualifies as activity is related to one or more programs being output, and may vary with power conservation system design. For example, user input and activity for a word processing program running on graphics component 45 of FIG. 1A may include: typing within the window 45, positioning a pointer within the window 45, clicking a button (e.g., using a mouse) within the window 45, manipulating menus and scrollbars within the window 45, a subset of these chosen by design, etc. User input for a music player program running on graphics component may include selecting songs to be played or manipulating volume and other audio output features. Video output for a music player program may include temporally-varying video that changes with the music based on program operation—without regular user input—such as an equalizer output or a clock that counts music time as a song plays. In one embodiment of the present invention, the music player program maintains an active graphics components status as a result of the temporally varying video output. In another embodiment, the power conservation system is designed such that temporally varying video output for the music player program does not qualify as activity. User input for an Internet browser window may include positioning a pointer within the window, typing addresses, and opening links, for example. In one embodiment, activity comprises temporally varying video output provided by a program whose video output intentionally varies over time without continued user input, such as a movie player. Video output is also common with Internet browsers and may or may not constitute interaction based on power conservation system design. User input for background 48 includes moving a pointer within background 48, selecting ('clicking' or 'double clicking') an icon 41, accessing individual items on control bar 43, etc.

Inactivity for a graphics component or window implies a lack of interaction in the window. As activity described above depends on a program associated with the window, so does inactivity. In one embodiment, inactivity is defined for an individual window according to a lack of activity for the window, which will depend on the program associated with the window. Thus, inactivity for word processing window 45 includes a lack of typing within the window boundary, a lack of positioning a pointer within the window boundary, a lack of manipulating menus and scrollbars within the window boundary, etc. Inactivity for background 48 may include a lack of positioning a pointer within the background 48 perimeter, a lack of initiating icons and menus, etc.

In one embodiment, the power conservation methods use a threshold inactivity time to determine when alterations to video information begin. The power conservation methods may alternatively alter video information immediately with inactivity in the display area. A user may set the threshold inactivity time via a graphics control. Once the threshold inactivity time has been reached, output power for the display device decreases according to one or more video manipulation techniques and the display device type.

In one embodiment, after the threshold inactivity time, video alterations and power conservation may continue at set power reduction intervals. The power reduction intervals determine specific times after the threshold inactivity time at which further video alterations are applied. This allows the altering video information to gradually change—and power conservation to gradually increase—over time and according to varying design or user preference. A user may set the power reduction intervals using a graphics control. In order for a power reduction interval to be met, inactivity continues in the display area or window for the duration of the interval. The threshold inactivity time and power reduction intervals are a matter of system design and user choice and may be different time periods.

Once the threshold inactivity time has past, the present invention alters video information such that a display device will consume less power than that which would be required without alteration. In addition, video information other than the characteristic color video information may continue to adapt as time proceeds to further reduce power consumption. An array of video manipulation techniques may be employed by the present invention to reduce power consumption.

Power conservation as shown in FIG. 1B reduces luminance for video information other than the characteristic color video information in border portion 45*a*. In one embodiment, the present invention reduces the luminance for all pixels other than the characteristic color video information by the same amount. In other words, the altered video information becomes darker by subtracting a constant value from the luminance value for each pixel. This effectively shifts a luminance histogram for the altered video information to a darker state. Such a luminance reduction may be implemented at a threshold inactivity time and at each power reduction interval.

The constant value may include a function of i) a maximum luminance for the video information other than the characteristic color video information (such as a percentage), ii) a maximum luminance provided by the display device, iii) a mean, median or mode of luminance values for the video information other than the characteristic color video information, or iv) a mean, median or mode of a luminance range values provided by the display device, etc. A suitable percentage of the maximum luminance for the video information other than the characteristic color video information may range from about 2 percent to about 100 percent of the maximum luminance. Thus, a 100 percent reduction turns video information black at the threshold inactivity time and maximizes energy conservation. A 5 percent luminance reduction at the threshold inactivity time and each power reduction interval thereafter steadily decreases luminance over time. Values less than 1 percent may be used for subtle and/or high frequency changes. While saving less power than a full 100 percent reduction, smaller alterations may be preferable to some users who prefer a less dramatic visual change. It is also understood that the percentage reduction at the threshold activity time and each power reduction interval may be different levels. For example, a 5 percent luminance reduction may be implemented at the threshold inactivity time, while a 2 percent, 10 percent, or escalating (0.25, 0.5, 1, 2, 4, 6, 8, 10 percent, etc.) reduction may be used at each power reduction interval.

In one aspect, the present invention builds a histogram for a set of pixels being altered and reduces power consumption for the pixels using one or more histogram-manipulation techniques. The histogram is a function showing, for each pixel value (e.g., luminance or chroma), the number of pixels in an image that have that pixel value. One embodiment alters pixel values by compressing and shifting a luminance histogram. More specifically, a luminance histogram is first constructed for a set of pixels to be altered. The luminance histogram is then compressed, e.g., about the mean, median or mode. A shift subsequently reduces the luminance values for all pixels in the compressed set by a constant. One suitable constant is a number that gives a pixel with the lowest luminance value in the new compressed histogram a zero luminance. The altered video information becomes darker since the final histogram luminance varies from zero luminance to a new maximum luminance produced as a result of the compression and shift.

A suitable amount of luminance compression may range from about 1 percent to about 50 percent of histogram luminance range. Another suitable compression may range from about 5 percent to about 20 percent of histogram luminance range. Compression and shifting may occur at the threshold inactivity time and at each power reduction interval, if desired. This process may repeat at subsequent power reduction intervals until the video information other than the characteristic color video information is almost black or until a predetermined cutoff is reached. Suitable cutoffs include: when the maximum luminance value other than the characteristic color video information reaches a predetermined minimum luminance, when the histogram reaches a minimum width, or when the difference between subsequent iterations is minimal.

The present invention may implement other compression and shift schemes. In one embodiment, the luminance histogram for a set of pixels is compressed only on one side, e.g., on the high end. If the histogram compression occurs just on the high end, the video information becomes darker for brighter pixels only. If the histogram compression occurs only on the low end of luminance values and then a shift is applied, the video information becomes darker for all pixels.

Although the present invention has primarily been discussed so far with linear and simple reductions in luminance for pixel values in an inactive portion, a power conservation system designer may apply more complicated video alteration and power conservation schemes. The relationship between power reduction, video alterations, and time may be established according to system design. One suitable power conservation scheme applies stepwise reductions of predetermined values at predetermined times. Another power conservation scheme employs an exponential decrease in luminance values as time proceeds. In this case, luminance reduction starts slowly in an initial time span, increases gradually in some midpoint time span, and then increases sharply in a later time span. A linear reduction based on $y=F(x^2)$, where y is a current luminance reduction, x represents the ith alteration in a number of alterations over time, and $F(x^2)$ is some function that increases power conservation as inactivity time passes or increases exponentially with a number of alterations to the video information. Linear constants and other mathematical operators may be inserted into the equation to alter video alterations as desired. Logic may also be applied in the video information manipulation to achieve a desired luminance vs. time curve.

In another embodiment, the present invention reduces the saturation for all pixels other than the characteristic color video information. In other words, the altered video information becomes less colorful (or more grey/black) by subtracting a constant value from RGB values for each pixel that differ from a white/grey/black shade. This effectively turns the altered video information to a grey/black according to the current luminance. A constant value or function such as one described above with respect to luminance reductions may be used to alter saturation information. Such a saturation reduction may be implemented at a threshold inactivity time and at each power reduction interval, if desired. Saturation and luminance reductions may also be done together.

Logic that limits further alterations to video information in subsequent power reduction intervals may also be implemented. At this point, the entire display area may be turned off (or alterations just stop). One suitable logic applies a lower limit that values of individual pixels other than the characteristic color video information may be reduced to, such as a percentage of an initial luminance or chroma level. For example, luminance reductions may cease for a pixel once the video information for a pixel reaches from about 5 percent to about 50 percent of its initial level—regardless of how it reached this point. In another embodiment, alterations cease when a minimally distinct border criteria has been set and reached. The minimally distinct border determines the limit at which visible differences are still perceivable between the characteristic color video information and neighboring video information. When the minimally distinct border is no longer present, the entire display area may be turned off. Time may alternatively be used to limit further alterations. For example, all video information other than the characteristic color video information may be turned off or turned black at a predetermined time. In addition, the entire display area, including the characteristic color video information, may be turned off at some second predetermined shut-off time.

In another embodiment, luminance reduction occurs gradually over time at smaller intermittent time intervals (e.g., less than a minute) and small luminance alterations, as opposed to larger and less frequent alterations. This technique provides a more gradual power reduction without sharp or noticeable changes in video content. For example, luminance in an inactive portion may decrease 1 percent every 10 seconds, thereby decreasing luminance by 60 percent over ten minutes without a large and obvious single change.

Advantageously, the present invention permits more aggressive alterations and power conservation, if desired, to video information other than the characteristic color video information since the video information being altered is often needed less by a user upon return to the device after inactivity.

In another embodiment, white video information is altered. This power conservation technique divides video information into white and non-white video information. 'White video information' refers to video information that has passed some threshold or criteria of whiteness. A power conservation system designer and/or user may define a white threshold—and thus specify what information is altered for white power conservation. Altering white video information to reduce power consumption may include reducing one or more RGB values for the white video information. This produces colors and shades that are 'off-white', or non-Full White. A 'replacement' shade of white (that consumes less power) may be used, such as Snow White (255-250-250), Ghost White (248-248-255), Floral White (255-250-240), White Smoke (245-245-245), or Old Lace (253-245-230).

Having discussed exemplary graphics, video information preservation, and video information alterations, video information representation and hardware power conservation will now be described in further detail. In general, video information alterations may include any changes to video information that decrease power consumption, and are not limited to any particular color scheme used by the hardware or by the software that implements power conservation.

Red, green, blue (ROB) color schemes are popular and suitable to characterize video information according to combinations of red, green and blue values. Video information is often stored according to an RGB scheme, while many display devices employ an RGB color scheme for video output. These display devices include a red, green, and blue optical modulation element for each pixel, such as individual RGB light emitting diode emitters for an OLED display device, individual RGB filters for an LCD device, or a digital micromirror element used in a projector that sequentially and selectively reflects incident red, green and blue light from a lamp and color wheel into a projection lens. In many RGB based devices, individual optical modulation elements receive commands for video output that include RGB values between 0 and 255 to produce a desired video output for a pixel. For example, one reddish color may initially comprise red/green/blue values of 251/45/62. According to luminance reduction techniques described above, the color may be darkened to 251/28/45, and subsequently darkened again to 169/3/16 (this maintains the relatively same hue for the reddish color).

In one embodiment, the present invention converts data to an HSL scheme and performs video alteration in the HSL domain. Converting RGB video information to and from HSL video information provides a simpler forum to implement luminance and/or saturation control. In a specific embodiment, the present invention sacrifices minor changes in color quality when performing luminance manipulation to achieve luminance targets and tailor video alteration changes. Depending on the size of the display device, the human eye generally detects changes in luminance more readily than changes in color. While the human eye can differentiate about 10 million colors, this level of differentiation is usually achieved by making side-by-side comparisons. The human eye can only identify about 300 different colors from memory. Luminance and luminance differences are often more detectable, but vary with size of the image.

Video information alterations may be applied in a number of color schemes, as one of skill in the art will appreciate. An HSL color scheme characterizes video output according to a wavelength or color (hue), degree of purity of the color—or degree of separation from gray having the same color (saturation), and degree of brightness for the color ranging from black to white (luminance). Cyan, magenta, yellow and black (CMYK) is another color scheme regularly used to characterize video output from display device according to combinations of cyan, magenta, yellow and black values. In general, power conservation techniques described herein may be implemented regardless of the color scheme used to store the video information or employed by a graphics-based user interface, video controller or display device. Alterations and video conservation as described herein may also apply to black and white video output.

Translation between the color schemes is well known to one of skill in the art. Thus, power conservation techniques described herein may be programmed or stored according to one color scheme, and output according to another color scheme for the display device. For example, video data manipulation techniques described herein may be implemented and stored in an HSL scheme, and then converted to and output by an RGB based display device.

Hardware power consumption and conservation will vary with display technology for the display device.

OLED display devices provide pixel granularity power consumption—and permit pixel granularity power conservation. OLED devices include a red, green, and blue individual light emitting diode or filter for each pixel. The amount of current sent to each light emitting diode or filter increases with each RGB color level between 0 and 255. Decreasing the RGB levels then reduces the amount of power for each diode and pixel. More specifically, altering white video information RGB values of 255/255/255 to a white shade of 235/235/235 reduces the amount of current sent to each individual light emitting diode for each pixel that emits the white shade. The amount of power conserved over the display area for the OLED display device can then be determined by summing the power saved for all pixels in the display area that have been altered.

In one embodiment, video alterations that include saturation reductions avoid increasing power consumption. This may occur for an OLED device for example when decreasing saturation actually increases red, green or blue values relative to previous RBG values, and threatens to increase power for each pixel. For example, one saturation reduction for a reddish color having RGB values of 251/45/62 to RGB values of 250/46/61 will decrease power. A saturation reduction for the same reddish color to 207/88/97 will actually increase power consumption. It is understood that different OLED devices may have different power consumption rates for red, green and blue individual light emitting diodes or filters for each pixel. Logic may then be used to determine if power actually decreases for the display area with a saturation reduction. Alternatively, power may be slightly sacrificed if the saturation reduction makes the display area more grey and the characteristic color video information more visible by color contrast.

Figure 3:
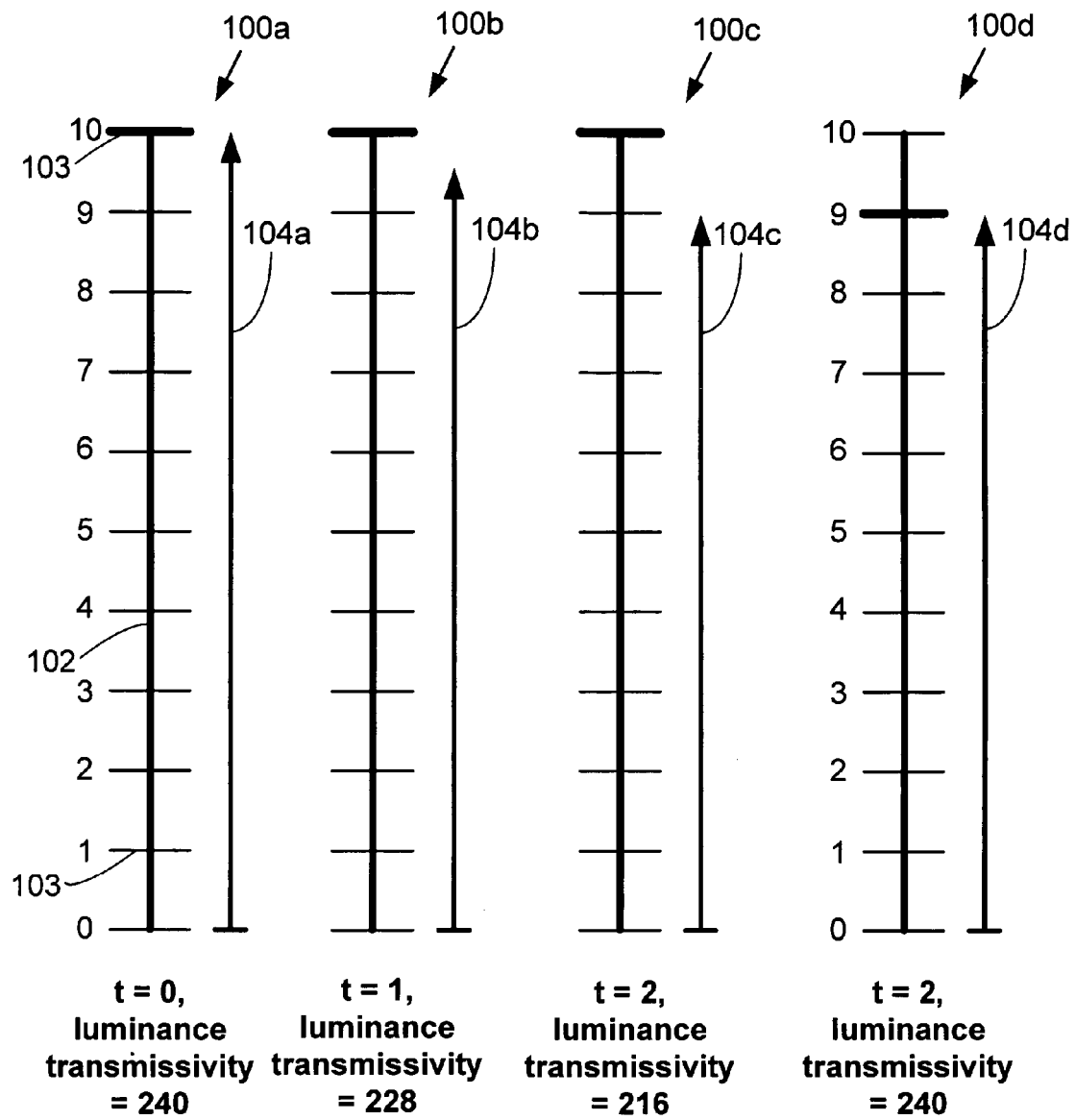
FIG. 3 shows video information alteration for an exemplary pixel for an LCD device to conserve power in accordance with one embodiment of the present invention.

LCD display device power consumption and conservation typically relates to backlight luminance. LCD devices provide two degrees of freedom for controlling luminance: 1) different luminance levels provided a backlight and 2) graduated filtering by optical modulation elements for each pixel. FIG. 3 shows video information alteration for an exemplary pixel for an LCD device to achieve power conservation. Four luminance states 100*a-d* are shown at three different times: t=0, t=1 and t=2.

Scale 102 illustrates a number of backlight luminance levels 103 offered by a backlight used in an LCD device. As shown, the LCD provides ten discrete backlight levels 103, numbered from 0 to 10, where 0 is off and 10 represents the maximum luminance for the backlight. In this simplified example, each increasing integer luminance level between 0 and 10 provides a proportionate increasing luminance (each level represents about 10% the maximum luminance) for the backlight. More complicated backlight levels are contemplated and suitable for use.

Transmissivity refers to the amount of light passage provided by optical modulation elements for a pixel. Many LCD devices include red green and blue (RGB) filters that act as optical modulation elements, where each filter regulates passage of white light produced by the backlight through a colored filter element to produce red, green and blue light, respectively. Transmissivity may then be expressed using RGB values sent on control signals to each RGB filter. LCD devices including modulation elements that respond to RGB transmissivity values ranging from 0 to 255 are common. The video information and transmissivity may also be expressed and converted from another video data scheme, such as HSL luminance. For example, luminance for each pixel may be provided at integers between 0 and 240, where zero represents black (full filtering and blocking of light provided by the backlight for each RGB filter) and 240 represents white (no filtering and blocking of light provided by the backlight).

As the term is used herein, 'aggregate luminance' refers to a luminance output to a viewer of an LCD device. This aggregate luminance combines luminance effects provided by a) the backlight and b) filtering provided by the optical modulation elements for each pixel. The aggregate luminance is typically limited to a maximum determined by the backlight level since the pixelated filters only reduce light currently offered by the backlight. For FIG. 3, maximum luminance for the LCD device corresponds to a backlight level of 10 and luminance transmissivity of 240. At backlight luminance level 9, the maximum aggregate luminance for video data corresponds to a luminance transmissivity of 240 (t=2). Aggregate luminance for the pixel is designated as 104*a-d* for FIG. 3 at each time instance.

Both the backlight level and the luminance transmissivity are controllable. In one embodiment, LCD power conservation leverages the two degrees of freedom in luminance control to reduce power for the LCD device.

At time t=0, the illustrated high luminance pixel (a white pixel) includes a backlight level of 10 and luminance transmissivity of 240, which corresponds to a maximum for the aggregate luminance and is designated as 104*a*.

LCD power conservation alters video information for the pixel. This reduces transmissivity and luminance for the pixel and/or the backlight level. For the example at time t=1, the backlight level remains at level 10 but the video information is altered to reduce the luminance transmissivity to 228. This provides an aggregate luminance of 104*b* (a less white shade).

In this case, information has been altered but without a backlight change, and no power conservation has yet been achieved.

At time t=2, the backlight level still remains at level 10 but the video information is altered to reduce the luminance transmissivity to 224 (an even less white shade). This provides an aggregate luminance of 104c. Aggregate luminance of 104c is noteworthy because it approximately corresponds to the aggregate luminance of 104d provided by the LCD device for the pixel when the backlight level drops to level 9 and the luminance transmissivity returns to 240 (its original level). At this luminance, the backlight level may drop from level 10 to level 9 and the luminance transmissivity increases from 224 to 240—without changing the aggregate luminance of 104 output to the viewer—or as perceived by a viewer. Thus, a person may not notice the backlight change. Power consumption for the backlight and LCD device reduces when the backlight level changes from level 10 to level 9.

For an LCD, aggregate luminance is then manipulated for all pixels affected by a backlight (some LCD devices include more than one). Video information for the image is altered to produce a new maximum luminance that is less than the next or largest available luminance at the next backlight level. Then, the LCD switches to the next backlight level.

Although the above example has been simplified to illustrate two degree of freedom luminance control and power conservation using and LCD, power conservation as described herein is not limited to such simple expressions of backlit luminance levels and pixel transmissivity. The above example employed ten backlight luminance levels; other numbers of backlight luminance levels are contemplated. In general, the LCD device may include any number of backlight luminance levels. As the granularity of backlit luminance levels increases, so does power conservation and the ability to more readily use a lower backlight level. The backlight luminance levels also need not correspond to simple fractions of the maximum luminance or integer levels as described above. In addition, luminance transmissivity is not limited to expression using a range of 1-240. Other luminance transmissivity and color schemes, such as normalized scales, are also suitable for use. As one of skill in the art will appreciate, the number and characterization of backlight luminance levels will depend on the LCD used, while the number and characterization of video information will depend on the video scheme used to represent the video data.

Aggregate luminance thus allows a designer to relate backlight luminance levels and pixel transmissivity for an LCD device, which permits a designer to alter the video information and direct the modifications towards backlight luminance reductions. An aggregate luminance model may be built for a device that estimates luminance perceived by a user as a combination of backlight and pixilated transmissivity. For example, the aggregate luminance may be used to provide a ratio (or another suitable mathematical relationship) between the backlight luminance levels and pixel transmissivity.

One video alteration embodiment for LCD use sets a high luminance limit for a histogram of luminance after an alteration. The high luminance limit refers to a reference luminance level for video information in the display area that may be used to guide alteration, e.g., before changing a next backlight luminance on an LCD device. The characteristic color video information may rest near the high luminance limit, while the remaining video information other than the characteristic color video information is altered to a lesser aggregate luminance. This maintains visible salience of the characteristic color video information relative to the remaining video information, and allows stepwise decreases in backlight luminance. This also allows luminance for any pixel in the image to remain relatively constant at the moment of each backlight level change (to produce little perceptible change). Further description of LCD based power conservation suitable for use with the present invention is described in commonly owned pending patent application Ser. No. 11/122,313 and entitled "LCD Plateau Power Conservation", which is incorporated herein in its entirety for all purposes.

Figure 4A:
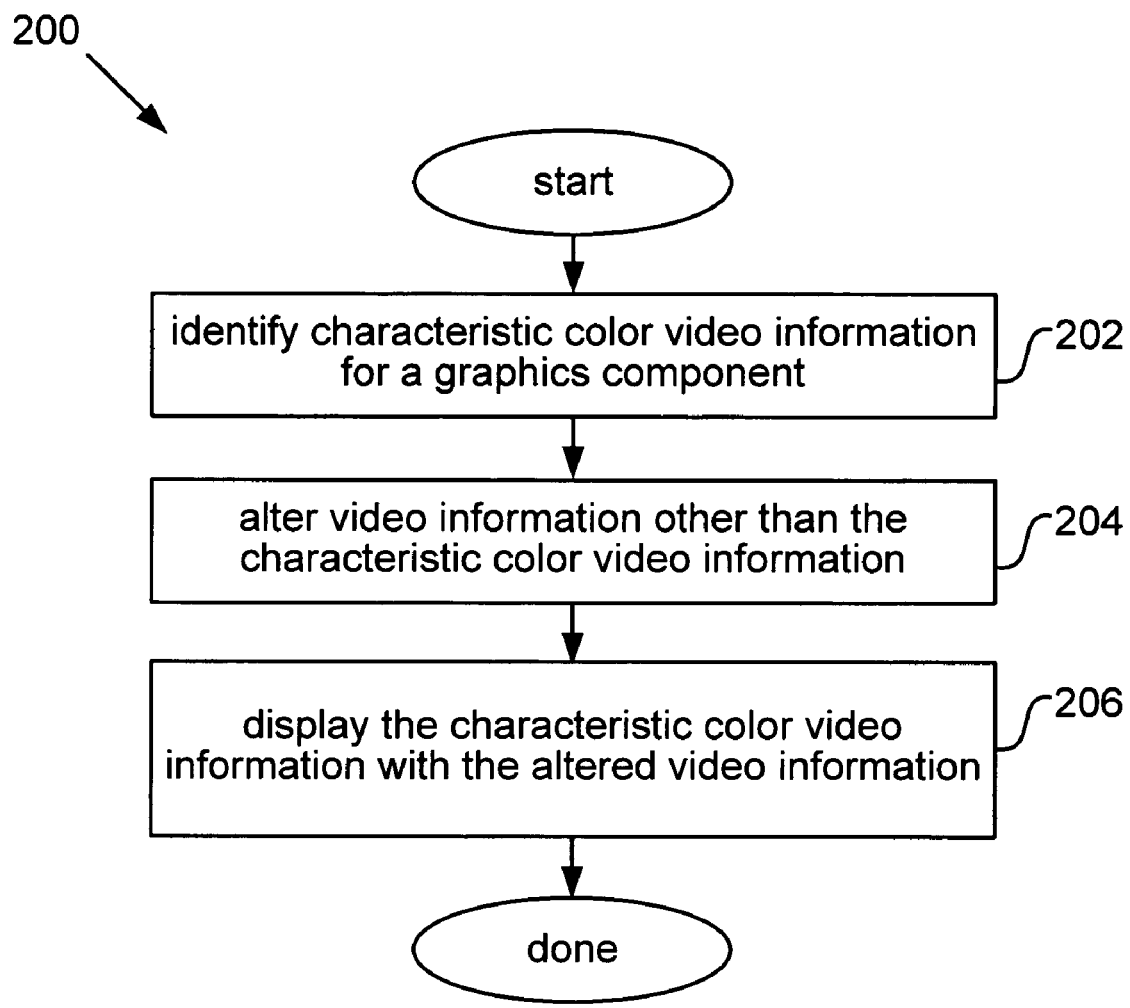
FIG. 4A illustrates a process flow for reducing power consumed by a display device in accordance with one embodiment of the invention.

FIG. 4A illustrates a process flow 200 for reducing power consumed by an electronics device and/or display device in accordance with one embodiment of the invention. While the present invention will now be described as a method and separable actions for reducing power consumption, those skilled in the art will recognize that the subsequent description may also illustrate hardware and/or software systems and items capable of performing the method and actions.

Process flow 200 begins by identifying characteristic color video information for a graphics component (202). Identification may vary based on the graphics component, graphical user interface, etc. In general, the characteristic color video information allows a person to visually locate the graphics component in a display area for the display device. In one embodiment, a power conservation program run on the electronics device automatically identifies the characteristic color video information for a graphics component according to system design. In another embodiment, a user toggles this functionality using a power conservation graphics control offered by a graphical user interface. The graphics control may also permit user input regarding what video information is preserved (e.g., border information, characteristic color, text, etc.).

Process flow 200 proceeds by altering the video information other than the characteristic color video information (204). The video information is altered such that the display device will consume less power when displaying the altered video information than an amount of power that would be required to display the video information without the alteration.

In a specific embodiment, video information alters immediately upon inactivity in the display area. One suitable luminance reduction scheme decreases luminance incrementally and alters video information at power reduction intervals that begin immediately upon user inactivity and have a frequency of greater than 1 alteration every 5 seconds. In this case, the incremental reductions decrease luminance by a tiny amount each time such that any individual alteration is not readily noticeable to a user. Cumulatively, however, the incremental alterations may accumulate to produce a significant change, such as a 50 percent reduction in luminance for the background and graphics components over five minutes for example. The gradual rate of alteration may be established according to power conservation system design or user preference, and advantageously allows video information to alter without substantially noticeable momentous changes. A magnitude for each incremental alteration may be determined by dividing a desired total alteration over a period of time by the number of intervals in the time period. For example, the progressive changes may occur as often as desired to produce a backlight luminance level change in an LCD device every 30 seconds. The backlight luminance level change may then occur without changing aggregate luminance perceived by a user.

The altered video information and characteristic color video information are then displayed together on the display device (206).

Altered video information returns—or reactivates—to its original state from an altered state after user activity with the display area, or as otherwise designated by a power conservation program designer. Reactivation displays the display area as it was initially displayed before any alterations. In a specific embodiment, positioning a pointer onto an area of a display area triggers reactivation. Reactivation may also include initiating a window via its corresponding toggle on toolbar 43. Power conservation system designers may also customize reactivation rules. For example, reactivation may be designed such that solely positioning and moving a pointer within a window or background does not satisfy reactivation criteria. In this case, clicking a button on a mouse while the pointer is within the window, or another explicit action within the graphics component, may satisfy reactivation.

In another embodiment, inactivity within the display area may be monitored and timed. The graphics-based user interface may include a global power saving tool that initiates after a predetermined time of inactivity throughout the entire display area. In this case, the global power saving tool turns off video display for the entire display area, including the characteristic color video information being preserved, when inactivity reaches the global power saving tool time limit, e.g., such as 5 minutes.

Figure 4B:
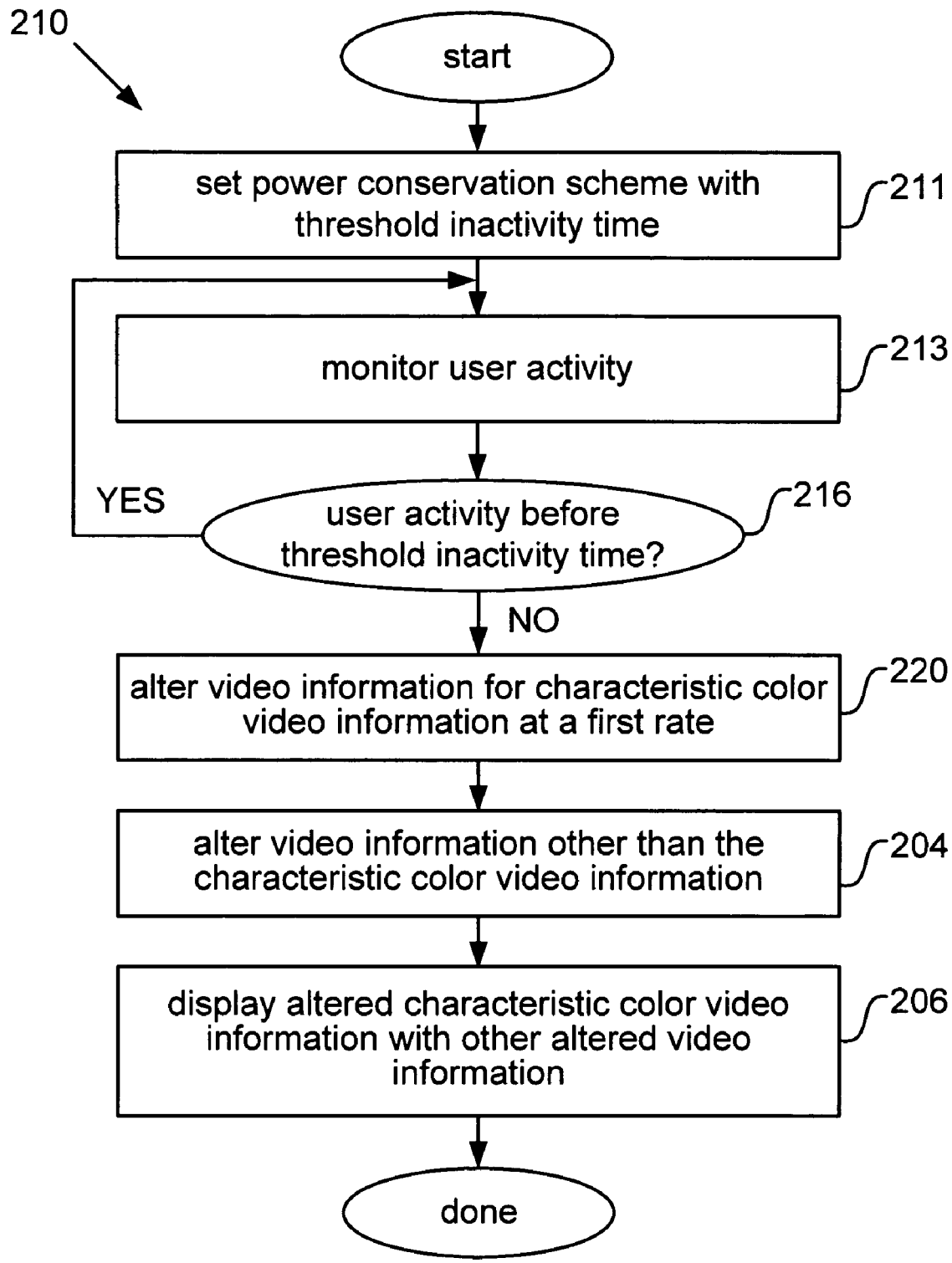
FIG. 4B illustrates a process flow for reducing power consumed by a display device in accordance with another embodiment of the invention.

FIG. 4B illustrates a process flow 210 for reducing power consumed by an electronics device and/or display device in accordance with another embodiment of the invention. Process flow 210 begins by setting a power conservation scheme (211). A power scheme refers to a collection of power options that dictate how and when video information is altered to reduce power consumption. In one embodiment, a power conservation system is stored on a computer and implements a power conservation scheme without user input. In another embodiment, a graphics control allows a user to set a power scheme or one or more power options corresponding to techniques described herein, e.g., identify the characteristic color video information.

For process flow 210, the power conservation scheme uses a threshold inactivity time to determine when alterations to video data begin. The threshold inactivity time may beset by a user via a graphics control, or automatically with power conservation system design. Once the threshold inactivity time has been reached, video information is altered to reduce power consumption.

After the power conservation scheme has been established, process flow 200 monitors user activity within the display area (213). Process flow 210 continues to monitor activity over time and reacts according to any user activity or lack thereof (216). If user activity occurs in the display area, process flow 210 then resets the inactivity monitor clock and returns to 213. If user inactivity continues until the threshold inactivity time, then process flow 210 alters video information.

In this embodiment, video information for the characteristic color video information is also altered. In this case, alterations to the characteristic color video information occur at a lesser rate than that for other video information. Process flow 200 proceeds by altering the video information for the characteristic color video information at a first rate (220). The change may include reducing the luminance for the characteristic color video information such that a next luminance level in an LCD device may be employed.

Power conservation also alters the video information other than the characteristic color video information (204). Since the characteristic color video information occupies a minor amount of space, this alteration leads to the majority of power conservation. Suitable techniques for altering video information other than the characteristic color video information were described above.

In this case, the video information for the characteristic color video information alters at a lesser rate than the video information other than the characteristic color video information. In one temporally varying embodiment, alterations to video information occur at set power reduction intervals. The power reduction intervals determine specific regular times at which minor but additive video alterations are applied. In this case, alterations to the characteristic color video information may occur less frequently (at larger intervals) than for video information other than the characteristic color video information. For example, progressive and stepwise changes to RGB values of the former may occur every twenty seconds while progressive and stepwise changes to RGB values of the latter may occur every ten seconds. Other intervals may be used. In one embodiment, a power reduction interval from one second to about 3 minutes is suitable. In another embodiment, a power reduction interval from about 1 second to about 10 seconds is suitable. It is understood that power reduction intervals are a matter of system design and user choice and may be include different time periods that those specifically provided herein.

The difference in rate of alteration may also include changes at the same frequency—but by different amounts at each interval. In this case, video information other than the characteristic color video information is altered more aggressively at each interval than that of the characteristic color video information.

In one embodiment, power conservation as described herein is implemented without user input. In another embodiment, a computer system provides a user the ability to turn on/off power conservation or tailor the power conservation to personal preferences that include the ability to identify characteristic color video information for a graphics component.

The present invention may also include controls for implementing power conservation. Graphics-based user interfaces employ what are referred to as graphics "controls". A graphics control is a discrete video object, for display by a display device, which can be manipulated by a user to alter one or more graphics outputs or effects and/or to initiate an action in an the graphical user interface. The graphics control often includes its own bitmap comprising an array of pixel values. For the present invention, the graphics control includes visual tools that allow a user to turn on/off visual preservation for characteristic color video information in general, and/or identify characteristic color video information for a graphics component. Further description of graphics controls suitable for use with the present invention is provided in commonly owned U.S. patent application Ser. No. 10/891,734, which was incorporated by reference above.

The present invention may also relate to systems for reducing power consumed by a display device. The power conservation system may comprise any combination of software and hardware for carrying out actions described herein. In a specific embodiment, general-purpose computer processing units, instead of dedicated hardware, implement the monitoring and video alteration techniques. Further description of power conservation systems suitable for use with the present invention is provided in commonly owned U.S. patent application Ser. No. 10/891,734, which was incorporated by reference above.

Figure 5:
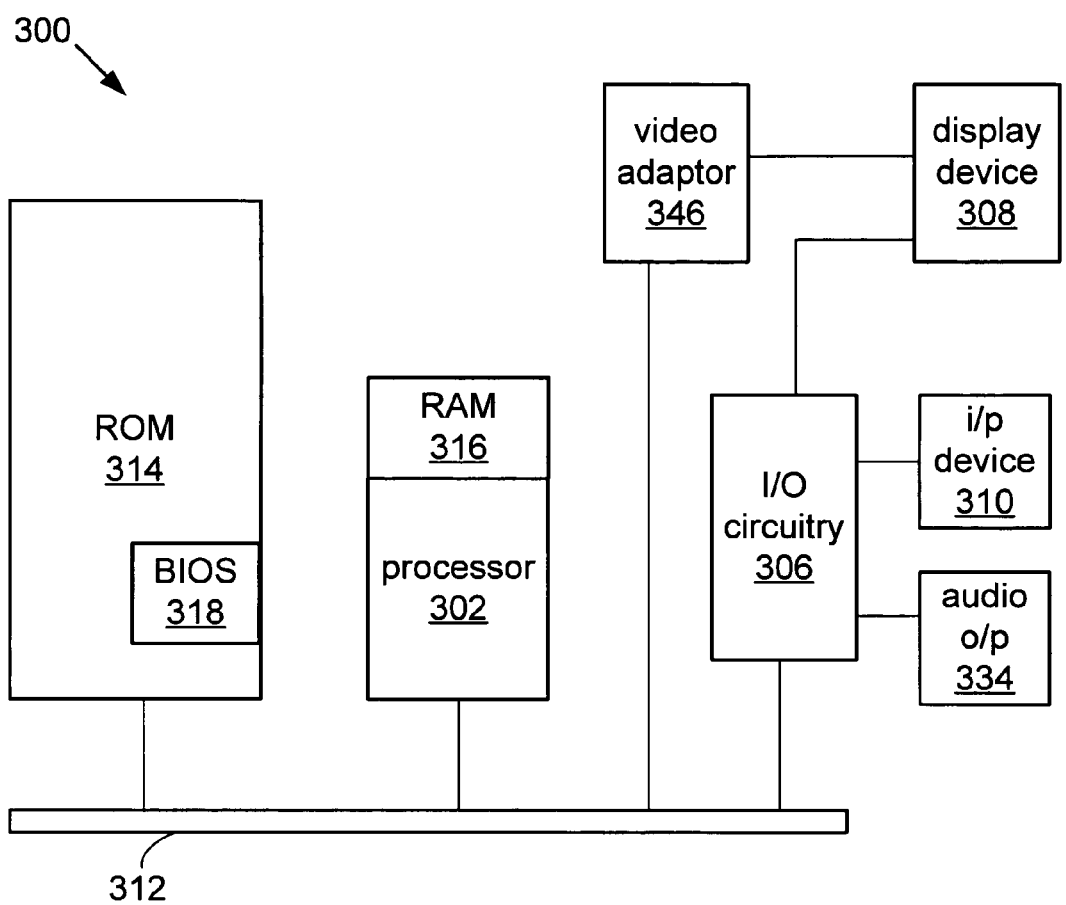
FIG. 5 illustrates an exemplary computer system suitable for implementing the invention.

The present invention finds use with computer systems such as desktop and laptop computers, personal digital assistants (PDAs), cellular telephones, digital cameras, portable computer systems, and the like. FIG. 5 schematically illustrates an exemplary general-purpose computer system 300 suitable for implementing the present invention.

Computer system 300 comprises a processor, or CPU, 302, one or more memories 314 and 316, input/output (I/O) circuitry 306, display device 308, input device 310, and system bus 312. System bus 312 permits digital communication between system processor 302 and ROM 314, as well as permits communication between other components within system 300 and processor 302 and/or ROM 314.

System 300 memory includes read only memory (ROM) 314 and random access memory (RAM) 316. Other memories may be included. ROM 314 stores a basic input/output system 318 (BIOS), containing basic routines that help to transfer information between elements within computer system 300, such as during start-up. Computer system 300 may also include a hard disk drive and an optical disk drive, for example. The optical disk drive reads from and may write to a CD-ROM disk or other optical media. The drives and their associated computer-readable media provide non-volatile storage for system 300. A number of program modules may be stored in the drives, ROM 314, and/or RAM 316, including an operating system, one or more application programs, other program modules, and program data. Although data storage above refers to a hard disk and optical disk, those skilled in the art will appreciate that other types of storage are suitable for use with a computer system, such as magnetic cassettes, flash memory cards, USB memory sticks, and the like. In addition, not all computer systems, such as PDAs and other portable devices may include multiple external memory options.

Processor 302 is a commercially available microprocessor such as one of the Intel or Motorola family of chips, or another suitable commercially available processor. Processor 302 digitally communicates with ROM 314 via system bus 312, which may comprise a data bus, control bus, and address bus for communication between processor 302 and memory 314. CPU 302 is also coupled to the I/O circuitry 306 by system bus 312 to permit data transfers with peripheral devices.

I/O circuitry 306 provides an interface between CPU 302 and such peripheral devices as display device 308, input device 310, audio output 334 and/or any other I/O device. For example, a mouse used as input device 310 may digitally communicate with processor 302 through a serial port 306 that is coupled to system bus 312. Other interfaces, such as a game port, a universal serial bus (USB) or fire wire, may also provide digital communication between a peripheral device and processor 302. I/O circuitry 306 may also include latches, registers and direct memory access (DMA) controllers employed for interface with peripheral and other devices. Audio output 334 may comprise one or more speakers employed by a headphone or speaker system.

Display device 308 outputs video information—both unaltered and altered—including graphics components, backgrounds, graphics controls such as those described herein, graphics-based user interfaces, and other visual representations of data. For example, display device 308 may comprise a cathode ray tube (CRT), liquid crystal display (LCD), organic light emitting diode (OLED), or plasma display, of the types commercially available from a variety of manufacturers. Display device 308 may also comprise one or more optical modulation devices, or the like, used in projecting an image. Projection display devices that project an image onto a receiving surface are becoming more popular, less expensive, more compact; and may employ one or more optical modulation technologies as well as a wide variety of individual designs. Common optical modulation devices include those employing liquid crystal display (LCD) technology and digital mirror device (DMD) technology. When used as a display device for a computer, these projection devices provide the potential for a much larger image size and user interface. In general, the present invention is not limited to use with any particular display device.

The present invention is independent of any particular display device, any mechanism of light generation for a display device, or any power consumption scheme for a display device, and only assumes that power consumption for display device 158 may vary with video information. In a specific embodiment, display device 158 can vary power consumption spatially on a pixel-by-pixel basis.

Display device 308 may also digitally communicate with system bus 306 via a separate video interface, such as a video adapter 346. Video adapter 346 is responsible for assisting processor 302 with video graphics processing including power conservation alterations described herein. Video adapter 346 may be a separate graphics card or graphics processor available from a variety of vendors that are well known in the art.

Input device 310 allows a user to enter commands and information into the computer system 300, and may comprise a keyboard, a mouse, a position-sensing pad on a laptop computer, a stylus working in cooperation with a position-sensing display on a PDA, or the like. Other input devices may include a remote control (for a projector), microphone, joystick, game pad, scanner, or the like. As used herein, input device refers to any mechanism or device for entering data and/or pointing to a particular location on an image of a computer display. Input as described herein may also come through intermediary devices. For example, a remote control may communicate directly with processor 302, or through an intermediary processor included in another device such as a hybrid entertainment device such as a set-top box or projector. The user may then input information to computer system 300 using an infrared remote control device that communicates first with the intermediary device, and then to processor 302.

In one embodiment, a graphics-based user interface implemented by computer system 300 displays a graphics control such as control described above. To display a power conservation graphics control, processor 302 issues an appropriate command, followed by an identification of data that is to be used to construct the graphics control. Such data may include a number of power conservation control tools that allow a user to change how video data is altered. ROM 314 also stores a number power conservation commands and instructions for implementing the techniques described herein. In one embodiment, the present invention is practiced in the context of an application program that runs on an operating system implemented by computer system 300 or in combination with other program modules on computer system 300.

The present invention may be implemented on a range of computer systems. In addition to personal computers such as desktop computers and laptop computers, a variety of other computer systems and computer devices employing a digital processor, memory and a display device may implement the present invention. Handheld computers and other small portable digital devices such as cell phones and digital cameras are increasingly integrating video display and computer functionality. One current trend is hybrid entertainment devices that integrate the functionality of computer systems, audio devices, and televisions. Any of these devices may employ and benefit from the power conservation methods and systems described herein. The scope of digital computer systems is expanding hurriedly and creating new devices that may employ the present invention. In general, any digital device employing an output display device that varies output power with video content may benefit from the present invention.

Moreover, those skilled in the art will appreciate that the invention may be practiced with other computer system configurations, multiple display device systems, multi-processor systems, microprocessor-based or programmable consumer electronics, minicomputers, mainframe computers, and the like.

The present invention is particularly useful to portable computing devices run with battery power. Most handheld devices are designed to rely on battery power. In addition, although the present invention has been discussed with respect to reduced power consumption, energy and power are relatively interchangeable in a discussion of the benefits of conservation.

Embodiments of the present invention further relate to computer readable media that include program instructions for performing power conservation techniques described herein. The media and program instructions may be those specially designed and constructed for the purposes of the present invention, or any kind well known and available to those having skill in the computer software arts. Examples of computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

Graphics controls and graphics-based user interfaces such as those described herein may be implemented using a number of computer languages and in a number of programming environments. One suitable language is Java, available from Sun Microsystems of Sunnyvale, Calif. Another suitable programming environment is the Microsoft Windows.RTM. programming environment, which provides a series of operating systems suitable for implementing the present invention both on laptop computers and handheld computers.

Although the foregoing invention has been described in some detail for purposes of clarity of understanding, those skilled in the art will recognize that various modifications may be made within the scope of the appended claims. In addition, although power consumption and conservation has not been detailed for every type of display device, the present invention is suitable with any display technology that can vary power output with video information. Projectors, for example, consume power based on the amount of light produced, which may be reduced using techniques described herein. The invention is, therefore, not limited to the specific features and embodiments described herein and claimed in any of its forms or modifications within the scope of the appended claims.

What is claimed is:

1. A method for reducing power consumed by an electronics device that includes a display device, the method comprising:

identifying characteristic color video information for a graphics component that allows a person to visually locate the graphics component based on its characteristic color video information in a display area for the display device;

monitoring user activity in the display area;

after a threshold inactivity time in the display area, altering video information in the display area, other than the characteristic color video information, to produce altered video information, such that the display device will consume less power when displaying the altered video information than an amount of power that would be required to display the video information without the alteration; and displaying the altered video information with the characteristic color video information.

2. The method of claim 1 wherein the characteristic color video information permits shape recognition of the graphics component.

3. The method of claim 1 wherein the graphics component includes one of: a window, an icon and a toolbar.

4. The method of claim 1 wherein the alteration comprises a luminance reduction for the video information in the display area other than the characteristic color video information.

5. A computer readable medium including instructions for reducing power consumed by an electronics device that includes a display device, the computer-readable medium comprising:

instructions for identifying characteristic color video information for a graphics component that allows a person to visually locate the graphics component based on its characteristic color video information in a display area for the display device;

instructions for altering video information in the display area, other than the characteristic color video information, to produce altered video information, such that the display device will consume less power when displaying the altered video information than an amount of power that would be required to display the video information without the alteration; and instructions for displaying the altered video information with the characteristic color video information.

6. The computer readable medium of claim 5, wherein the display area includes multiple windows, and further comprising instructions for identifying characteristic color video information for each window.

7. A method for reducing power consumed by an electronics device that includes a display device, the method comprising:

identifying characteristic color video information for a graphics component that allows a person to visually locate the graphics component based on its characteristic color video information in a display area for the display device;

altering video information in the display area, other than the characteristic color video information, to produce altered video information, such that the display device will consume less power when displaying the altered video information than an amount of power that would be required to display the video information without the alteration; and displaying the altered video information with the characteristic color video information.

8. The method of claim 7 wherein the characteristic color video information permits shape recognition of the graphics component.

9. The method of claim 7 wherein the characteristic color video information includes color video information in a border portion of a window.

10. The method of claim 9 wherein altering video information includes altering video information in an internal portion of the window that is inside the border portion.

11. The method of claim 7 wherein the display area includes multiple windows and the characteristic color video information is identified for a window that was last active in the display area according to user input.

12. The method of claim 7 wherein the display area includes multiple windows and the characteristic color video information is identified for each window.

13. The method of claim 7 wherein the graphics component outputs video information for one of: a word processing program, an Internet Browser interface, and a file navigation program.

14. The method of claim 7 wherein the graphics component includes one of: a window, an icon and a toolbar.

15. The method of claim 7 wherein the alteration comprises a luminance reduction for the video information in the display area other than the characteristic color video information.

16. The method of claim 15 wherein the luminance reduction includes a histogram compression and a histogram shift for the video information in the display area other than the characteristic color video information.

17. The method of claim 7 wherein further comprising a second alteration of the video information in the display area other than the characteristic color video information.

18. The method of claim 7 wherein the alteration comprises a saturation reduction for the video information in the display area other than the characteristic color video information.

19. The method of claim 7 wherein the display device is an OLED device.

20. The method of claim 7 wherein the display device is included in one of: a laptop computer, a handheld computer, a portable phone or a portable music player.

* * * * *